L. BASTET.
Galvanic-Battery.
No. 211,213. Patented Jan. 7, 1879.
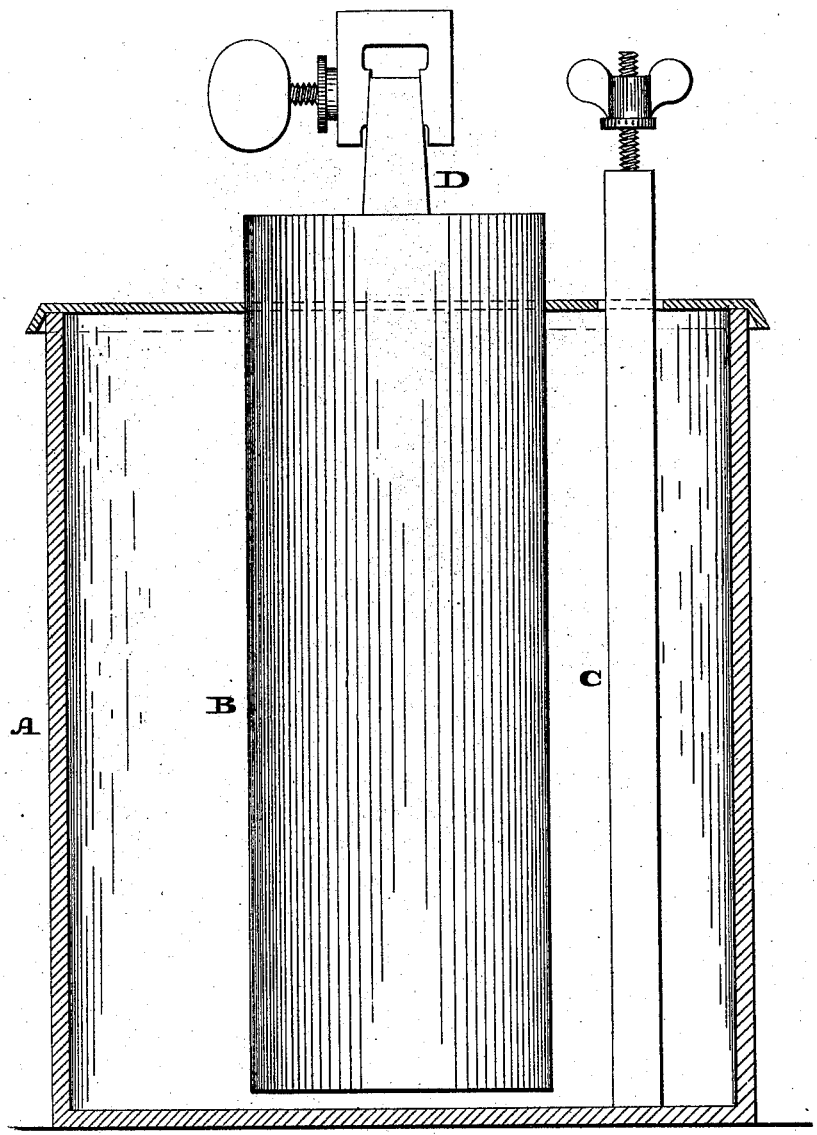

UNITED STATES PATENT OFFICE.

LOUIS BASTET, OF PHILADELPHIA, PENNSYLVANIA, ASSIGNOR TO THE METROPOLITAN PATENT RIGHT COMPANY.

IMPROVEMENT IN GALVANIC BATTERIES.

Specification forming part of Letters Patent No. 211,213, dated January 7, 1879; application filed March 6, 1878.

*To all whom it may concern:*

Be it known that I, LOUIS BASTET, of the city of Philadelphia, State of Pennsylvania, have invented a new and useful Galvanic Battery; and I do hereby declare that the following is a full, clear, and exact description thereof, which will enable others skilled in the art to make and use the same, reference being had to the accompanying drawing, forming part of this specification.

In my improved galvanic battery the negative element is a plate of pure metal of antimony, placed in a porous cell, and surrounded by a mixture of carbon and antimony in a dry state.

In the accompanying drawing, the figure is a partial vertical section.

A is the casing, made of glass or other suitable material. B is the porous cell, which is placed in the case A, surrounded with the salt moist with water. C is the zinc plate, which is placed in the water between the porous cell and the case. D is the plate of antimony within the porous cell or bag of cloth or paper, or any animal substance.

I introduce antimony and carbon or coke, in a dry state, in the porous cell, those two ingredients in equal quantities, well mixed together, to charge the porous cell or bag.

Having thus described my invention, I claim—

As a negative element in galvanic batteries, a plate of antimony, contained in a porous cell and surrounded by a mixture of carbon and antimony within the cell, substantially as described.

LOUIS BASTET.

Witnesses:
JOHN A. WIEDERSHEIM,
DAN. S. ROBESON.